United States Patent [19]

Hasegawa

[11] Patent Number: 4,553,516
[45] Date of Patent: Nov. 19, 1985

[54] IDLING RPM CONTROL METHOD FOR AN INTERNAL COMBUSTION ENGINE ADAPTED TO IMPROVE FUEL CONSUMPTION CHARACTERISTIC OF THE ENGINE

[75] Inventor: Shumpei Hasegawa, Niiza, Japan

[73] Assignee: Honda Giken Kogyo Kabushiki Kaisha, Tokyo, Japan

[21] Appl. No.: 582,318

[22] Filed: Feb. 22, 1984

[30] Foreign Application Priority Data

Feb. 28, 1983 [JP] Japan ................................. 58-32538

[51] Int. Cl.4 .......................... F02D 9/02; F02D 11/10
[52] U.S. Cl. ...................................... 123/339; 123/440; 123/585
[58] Field of Search ........................ 123/339, 585, 440; 290/40 B

[56] References Cited

U.S. PATENT DOCUMENTS 2,804,552  8/1957  McFarland ...................... 123/339 X
2,809,300  10/1957 McFarland ...................... 123/339 X
4,138,975  2/1979  Hamelin et al. ...................... 123/339
4,237,838  12/1980 Kinugawa et al. .............. 123/339 X Primary Examiner—Tony M. Argenbright
Attorney, Agent, or Firm—Lyon & Lyon

[57] ABSTRACT

A method of controlling the idling rpm of an internal combustion engine which rotatively drives an alternating-current generator through an output shaft thereof. The method is adapted to detect a value of a parameter indicative of the field current of the generator which is varied by regulator means in response to electrical load applied on same, and control an actuator operable to vary output torque produced by the engine through the output shaft, in response to the detected value of the parameter when the engine is operating in an idling condition, to thereby control the engine rpm in a manner such that the value of the field current becomes equal to a predetermined value.

13 Claims, 8 Drawing Figures

4,553,516

IDLING RPM CONTROL METHOD FOR AN INTERNAL COMBUSTION ENGINE ADAPTED TO IMPROVE FUEL CONSUMPTION CHARACTERISTIC OF THE ENGINE

BACKGROUND OF THE INVENTION

This invention relates to an idling rpm control method for internal combustion engines, and more particularly to a method of this kind which is intended to improve the fuel consumption characteristic of the engine while the engine is operating in an idling condition.

An internal combustion engine for automotive vehicles is generally disposed to rotatively drive an alternating-current generator which supplies electric power to electrical load-creating equipments such as a heater and air conditioner and lighting systems provided in the automotive vehicle. With this arrangement, if one or more of such electrical load-creating equipments are turned on, the field current of the generator is increased by the action of a regulator provided in the generator so that the generator operates to increase its own output power. However, while the engine is operating in an idling condition, the phenomenon can occur that the amount of electric power required by the electrical load-creating equipment exceeds the maximum output power of the generator that is determined by the output torque of the engine and the rotational speed of the generator. On such an occasion, a battery provided in the engine supplies electric power to the electrical load-creating equipment to compensate for a resultant shortage of electric power. Consequently, the battery can be overdischarged to have its effective life reduced, and the resultant reduction in the voltage of the battery can cause degraded startability of the engine, and other inconveniences.

To eliminate the above inconveniences, an idling rpm feedback control method has been proposed (e.g. by Japanese Patent Provisional Publication (Kokai) No. 54-155317) which comprises setting the desired idling rpm at such a value that the generator can produce electric power in an amount enough to compensate for the electrical loads applied thereon by the electrical load-creating equipment, and supplying an air/fuel mixture to the engine in a quantity corresponding to the difference between the desired idling rpm and the actual engine rpm, to thus control the rotational speed of the engine to the desired idling rpm in a feedback manner. However, according to this proposed method, the desired idling rpm has to be set at a certain high value such that the generator can produce sufficient electric power even if all the electrical load-creating equipment is operating at the same time while the engine is in an idling condition. Consequently, the rotational speed of the engine is maintained at the above high desired idling rpm even when no electrical load-creating equipment is operating, resulting in increased fuel consumption of the engine.

SUMMARY OF THE INVENTION

It is an object of the invention to provide an idling rpm control method for an internal combustion engine, which is adapted to operate the alternating-current generator so as to produce sufficient electric power, and at the same time, operate the engine at a low speed without causing overdischarge of the battery of the engine, while the engine is operating in an idling condition, to thereby improve the fuel consumption characteristic of the engine during idling operation of same.

It is another object of the invention to provide an idling rpm control method for an internal combustion engine, which is adapted to control the value of field current flowing in the alternating-current generator within a predetermined range of values while the engine is operating in an idling condition, to thereby perform the idling rpm control of the engine with enhanced stability.

According to the invention, an idling rpm control method is provided for an internal combustion engine which has an output shaft, an actuator operable to vary output torque produced by the engine through the output shaft, and an alternating-current generator driven by the engine through the output shaft for rotation therewith to generate electric power in an amount corresponding to the value of field current flowing in the generator and the rotational speed of same.

According to a first feature of the invention, the method is characterized by comprising the steps of: (a) detecting a value of a parameter indicative of the field current of the alternating-current generator, which is varied by regulator means in response to electrical load applied on the generator; (b) determining whether or not the engine is operating in an idling condition; and (c) controlling the operation of the actuator in response to the detected value of the parameter to vary the output torque of the engine, to thereby control the rotational speed of the engine such that the value of the field current of the alternating-current generator becomes equal to a predetermined value, when it is determined that the engine is operating in the idling condition.

According to a second feature of the invention, in addition to the aforementioned steps (a) and (b), it is determined whether or not the detected value of the parameter is larger than a first predetermined value, and also determined whether or not the same detected value is smaller than a second predetermined value which is smaller than the first predetermined value. When it is determined that the engine is operating in an idling condition and at the same time the detected value of the parameter is larger than the first predetermined value, the actuator is controlled in a manner such that the output torque of the engine is increased to thereby increase the rotational speed of the engine. On the other hand, when it is determined that the engine is operating in an idling condition and at the same time the detected value of the parameter is smaller than the second predetermined value, the actuator is controlled in a manner such that the output torque of the output shaft is decreased to thereby decrease the rotational speed of the engine. Consequently, the rotational speed of the engine is controlled such that the value of the field current of the alternating-current generator is maintained within a predetermined range, when it is determined that the engine is operating in the idling condition.

The above and other objects, features and advantages of the invention will be more apparent from the ensuing detailed description taken in conjunction with the accompanying drawings.

DETAILED DESCRIPTION

The method of the invention will now be described in detail with reference to the drawings showing embodiments thereof.

Figure 1:
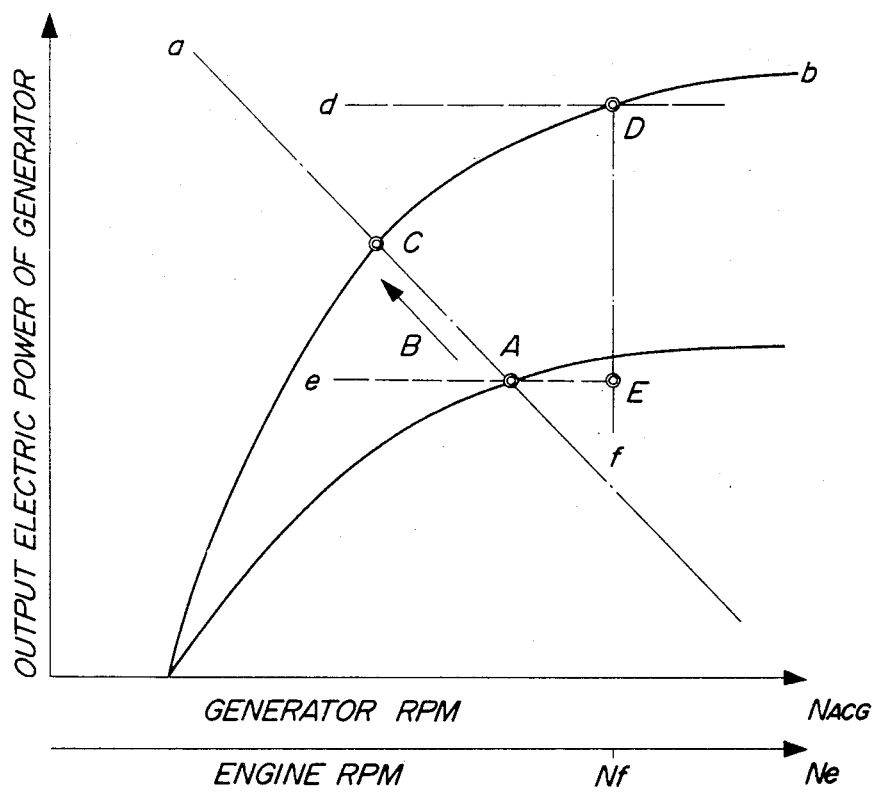
FIG. 1 is a graph showing the relationship between the output electric power of an alternating-current generator and the rotational speed of same, wherein the generator is operated in a conventional manner.

Referring first to FIG. 1, there are shown, by way of example, a conventional manner of operating an alternating-current (AC) generator and a conventional manner of controlling the idling rpm of an internal combustion engine equipped with the generator. When all the electrical load-creating equipment installed in the vehicle are turned on during low-speed idling operation of the engine, the resultant increase in the electrical load on the engine causes an increase in retarding load applied on the engine to decrease the rotational speed Ne of the engine and accordingly the rotational speed NACG of the generator, so long as the output torque of the engine remains constant. On such occasion, the field current of the generator is increased by the action of a regulator provided in the generator. Consequently, the operative state of the generator is shifted from a point A in FIG. 1 wherein no electrical load is applied on the engine, to another point C wherein the generator can produce its maximum output power, along the one-dot chain line a in the direction indicated by the arrow B in the same figure. However, if the required electric power that has to compensate for these electrical loads amounts to a value shown by the broken line d, there still exists a shortage of electric power and accordingly a battery provided in the engine supplies electric power to the electrical load-creating equipment to compensate for such shortage. In the event that the supply of electric power from the battery is continued for a considerable time, the battery can be overdischarged, to result in a shortened effective life of same. Even other inconveniences such as degraded startability of the engine can be caused when the engine is restarted by the use of the battery insufficiently charged, due to a decrease in the rotational speed of a starter motor which is driven by the battery. Incidentally, the broken line e in FIG. 1 indicates a value of electric power required when no electrical load is applied on the engine.

In order to eliminate the above inconveniences caused during idling operation of the engine, a method has been proposed by Japanese Patent Provisional Publication No. 54-155317 hereinbefore referred to, which comprises setting desired idling rpm Nf at such a value that the generator can produce electric power in an amount sufficient to cope with the electrical loads, as shown in FIG. 1, and supplying an air/fuel mixture to the engine in a quantity corresponding to the difference between the actual engine rpm Ne and the desired idling rpm Nf, thereby varying the output torque of the engine in response to loads applied on same, inclusive of a load applied applied by the generator, to thus control the engine rpm Ne to the desired idling rpm Nf in a feedback manner. According to this method, due to the operation of the regulator of the generator, the operative state of the generator changes between points D and E along the one-dot chain line f corresponding to the desired idling rpm Nf, in a manner responsive to changes in the electrical load applied on the generator, thereby making it possible to produce electric power in an amount falling between two values indicated by the symbols d and e in FIG. 1. However, according to this proposed method, as noted before, the desired idling rpm Nf of the engine has to be set at a value above a certain high level, to ensure that the generator can produce electric power in an amount sufficient to compensate for all the electrical loads even if all the electrical load-creating equipments are turned on. Therefore, even if the generator is released from electrical loads, the rotational speed of the engine is controlled so as to remain at the predetermined value, thus increasing the fuel consumption of the engine while the engine is in an idling condition.

Figure 2:
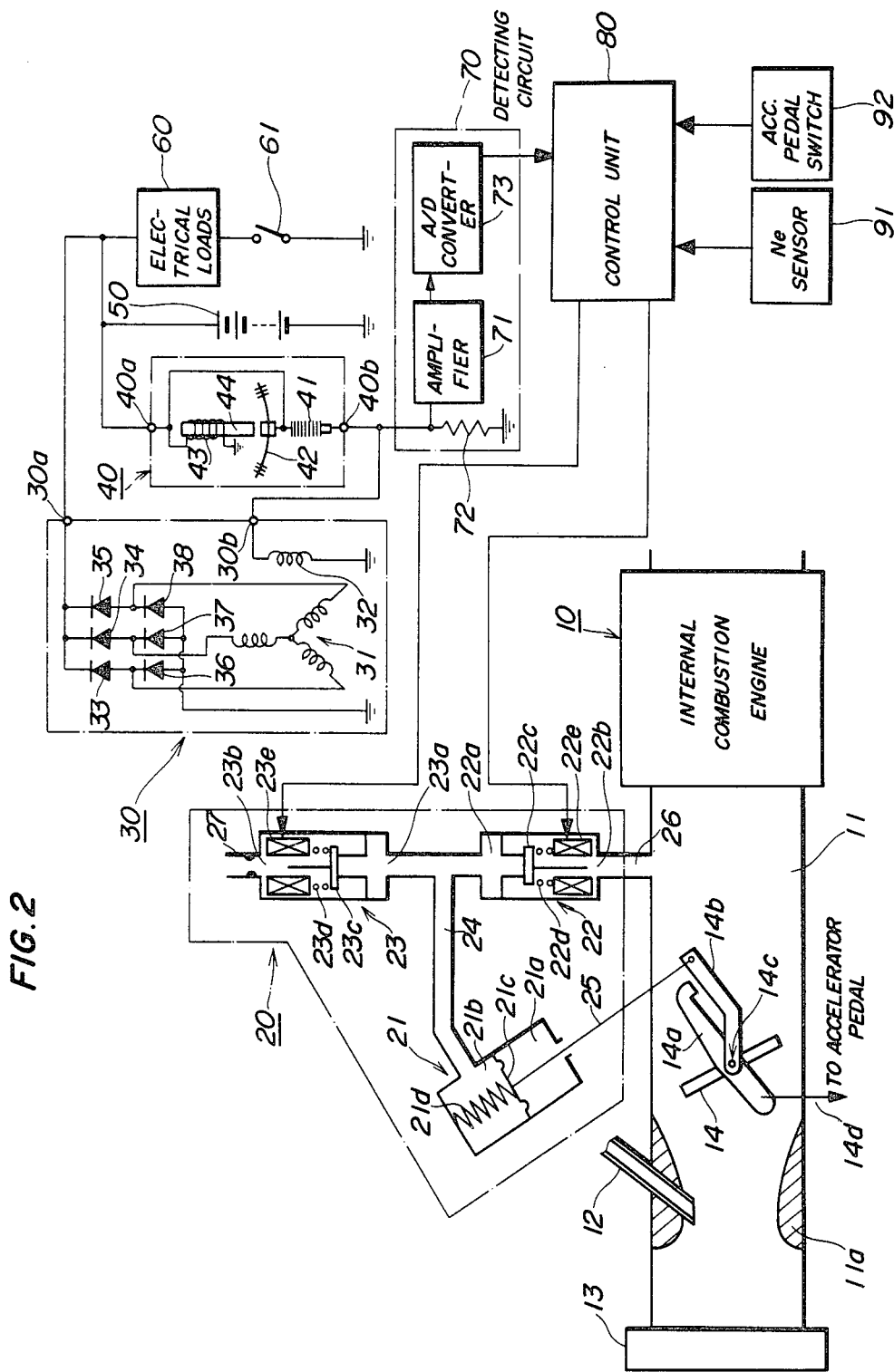
FIG. 2 is a view illustrating the whole arrangement of an idling rpm control system for an internal combustion engine, to which is applied the method of the invention.

FIG. 2 through FIG. 5 show one embodiment of the invention. Referring first to FIG. 2, there is illustrated an idling rpm control system for an internal combustion engine, to which the method of the invention is applied. An intake pipe 11 of the engine 10 is formed therein with a venturi 11a, and a main jet 12 which is connected to a fuel pump, not shown, opens in the venturi 11a. The intake pipe 11 is provided with an air filter 13 at a location upstream of the main jet 12, while a throttle valve 14 is arranged in the intake pipe 11 at a location downstream of the main jet 12. The throttle valve 14 has a first lever 14a formed integrally therewith and a second lever 14b formed separately from the members 14 and 14a, and disposed to be opened and closed by pivotal movement of the levers 14a and 14b about a common pivot 14c. The first lever 14a has its one end connected to an accelerator pedal, not shown, by means of a wire 14d to be rotated about the pivot 14c as the accelerator pedal is stepped on, so as to open the throttle valve 14 independently of the angular position of the second lever 14b through an angle corresponding to the stepping amount of the accelerator pedal. Once the first lever 14a abuts at its other end against the second lever 14b, a further rotation of the first lever 14a in the clockwise direction in FIG. 2 is prohibited by the second lever 14b. The second lever 14b is disposed such that, once the second lever 14b abuts against the first lever 14a, a counterclockwise rotation of the second lever 14b causes corresponding displacement of the first lever 14a in the counterclockwise direction to open the throttle valve 14.

Reference numeral 20 designates an actuator which comprises as its essential component elements a control valve 21, and two solenoid valves 22 and 23, both of a normally closed type. The actuator 20 is intended to control the valve opening of the throttle valve 14 while the engine is operating in an idling condition, to thereby control the quantity of an air/fuel mixture being supplied to the engine 10. The control valve 21 comprises an atmospheric chamber 21a communicating with the atmosphere, a control chamber 21b communicating with the interior of a pipe 24, a diaphragm 21c defining the chambers 21a, 21b at its opposite sides and connected to the second lever 14b of the throttle valve 14 via a connecting member 25, and a spring 21d urging the diaphragm 21c in such a direction as to cause the throttle valve 14 to be displaced toward its fully closed position. The solenoid valve 22 comprises a first port 22a communicating with the pipe 24, a second port 22b communicating through a vacuum-intake pipe 26 with the intake pipe 11 at a location downstream of the throttle valve 14, a valve body 22c arranged between the first and second ports 22a, 22b, a spring 22d urging the valve body 22c toward its closed position, and a solenoid 22e connected to a control unit 80 so as to be driven thereby to bias the valve body 22c toward its opened position when energized. On the other hand, the solenoid valve 23 comprises a first port 23a communicating with the pipe 24, a second port 23b communicating with the atmosphere through an atmospheric pressure-communicating pipe 27, a valve body 23c arranged between the first and second ports 23a and 23b, a spring 23d urging the valve body 23c toward its closed position, and a solenoid 23e connected to the control unit 80 so as to be driven thereby to bias the valve body 23c toward the opened position when energized.

Reference numeral 30 designates an alternating-current (AC) generator which comprises an armature winding 31 having a Y-connection, a field winding 32, diodes 33, 34 and 35 having their anodes connected to the armature winding 31, and diodes 36, 37 and 38 having their anodes grounded. The AC generator 30 has an output terminal 30a connected to cathodes of the diodes 33, 34, 35 as well as to an input terminal 40a of a regulator 40, while the AC generator 30 has a field current input terminal 30b connected to the field winding 32 and an output terminal 40b of the regulator 40. The AC generator 30 is coupled to a crankshaft, not shown, of the engine 10 through a power transmission means such as a pulley, not shown, in a manner driven by the engine 10 to produce electric power as the engine 10 rotates.

The regulator 40 is, for instance, a "carbon-pile" type and comprises an input terminal 40a, an output terminal 40b, a carbon pile 41 connecting the input terminal 40a to the output terminal 40b, a pressure spring 42 permanently urging the carbon pile 41 in such a direction as to decrease the resistance value of the carbon pile 41, a coil 43 connected at one end to the input terminal 40a and grounded at the other end, and a core 44 extending through the coil 43. When an electric current flows into the coil 43 from the generator 30 or a battery 50, the core 44 is energized to electromagnetically attract the spring 42 to increase the resistance value of the carbon pile 41. Thus, the regulator 40 is adapted to supply through its output terminal 40b an electric current which has its value increased with a decrease in the voltage value at the input terminal 40a, to the field winding 32 of the AC generator 30.

The battery 50 has its anode terminal connected to the output terminal 30a of the generator 30 as well as to electrical loads 60 such as headlights and a heater and air conditioner, which are turned on when switches 61 are closed.

A detecting circuit 70 comprises, for instance, an operational amplifier 71, a resistor 72 having one end connected to the input terminal 30b of the generator 30, the output terminal 40b of the regulator 40 and the input of the amplifier 71, and its other end grounded, and an analog-to-digital (A/D) converter 73 connected to the output of the amplifier 71. The detecting circuit 70 is adapted to detect the terminal voltage of the resistor 72, which corresponds to the value of the field current flowing in the field winding 32 of the generator 30, and supply the control unit 80 with a digital signal indicative of detected terminal voltage. Alternatively of the illustrated construction, the detecting circuit 70 may comprise a resistor connected in series with the terminals 40b and 30b, for detecting the field current of the generator 30.

The control unit 80 is supplied with a signal indicative of the rotational speed of the engine 10 from an engine rpm (Ne) sensor 91, as well as with an on-off signal from an accelerator pedal switch 92 which is adapted to generate an ON signal when the stepping amount of the accelerator pedal, not shown, is zero, that is, when the throttle valve 14 is in its fully closed position. The control unit 80 is adapted to determine the value of the field current of the generator 30, and operate on the resultant determination to energize one of the solenoids 22e, 23e of the actuator 20 or deenergize both of the solenoids 22e, 23e, as described hereinafter.

Figure 3:
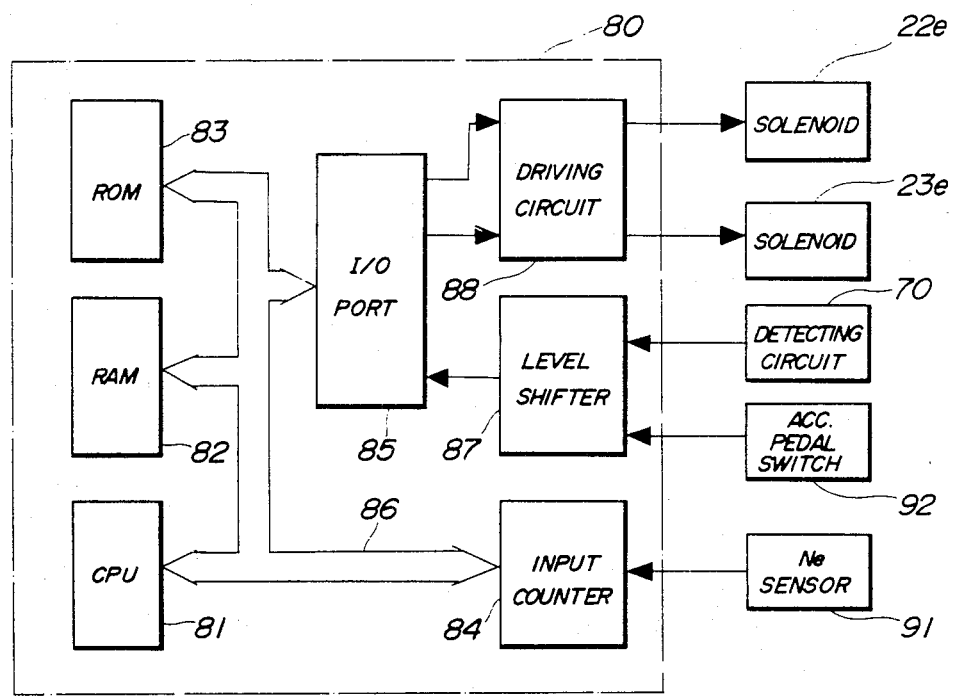
FIG. 3 is a block diagram showing an example of the circuit configuration of a control unit shown in FIG. 2.

FIG. 3 shows the arrangement of an electrical circuit within the control unit 80 shown in FIG. 2. The control unit 80 comprises a central processing unit (hereinafter called "the CPU") 81, a random access memory (hereinafter called "the RAM") 82 for temporarily storing the resultant values of various calculations from the CPU 81, etc., a read-only memory (hereinafter called "the ROM") 83 storing a control program, referred to later, executed within the CPU 81, etc., an input counter 84 connected to the engine rpm sensor 91, and an input-output (I/O) port 85. These elements 81–85 are connected with each other via a bus 86 for exchanging signals therebetween. The control unit 80 further comprises a level shifter 87 having its output connected to the input-output port 85 and its input connected to the detecting circuit 70 as well as to the accelerator pedal switch 92, and a driving circuit 88 having its input connected to the input-output port 85 and its output connected to the solenoids 22e and 23e.

The control system described so far with reference to FIGS. 2 and 3 operates as follows: The AC generator 30 is rotatively driven by the engine 10 while the latter is operated, to generate a three-phase induced current in the armature winding 31. The inducing current thus produced is subjected to full-wave rectification by the diodes 33–38 and thereafter supplied to the battery 50 to charge same. On the other hand, upon the ignition switch, not shown, of the engine being turned on, the regulator 40 starts to transmit an electric current from the battery 50 as field current to the field winding 32 through the carbon pile 41d, to render the generator 30 operative. When the generated voltage of the generator 30 is increased with an increase in the rotational speed Ne of the engine, increased electromagnetic force occurs in the coil 43 and the core 44 of the regulator 40 to electromagnetically attract the pressure spring 42 more strongly. Accordingly, the urging force of the pressure spring 42 acting upon the carbon pile 41 reduces to increase the resistance value of the carbon pile 41, thereby decreasing the value of the field current to be supplied to the field winding 32. On the other hand, as the generated voltage of the generator 30 decreases, the field current is increased. In this way, the generated voltage is regulated to a constant value. According to the invention, the field current has its value controlled while the engine is operating in an idling condition, as described hereinafter.

The field current from the regulator 40, the value of which is increased or decreased in the above-described manner, causes a correspondingly increasing or decreasing voltage across the resistor 72 of the detecting circuit 70, and this voltage is applied, as a signal indicative of detected field current, through the operational amplifier 71 and the A/D converter 73 to the control unit 80 in the form of a digital signal.

Referring now to FIG. 3, the input counter 84 of the control unit 80 is supplied with a signal indicative of the rotational speed of the engine (hereinafter called "the TDC signal") from the engine rpm sensor 91. The input counter 84 counts the interval of time between a preceding pulse of the TDC signal and a present pulse of the same signal, inputted thereto from the engine rpm sensor 91, and therefore its counted value Me is proportional to the reciprocal of the actual rotational speed of the engine. The input counter 84 supplies the counted value Me to the CPU 81 via the bus 86. On the other hand, the field current value signal from the detecting circuit 70 and the on-off signal from the accelerator pedal switch 92 indicative of opened and closed states of the throttle valve 14 have their respective levels shifted to a predetermined level by the level shifter 87, and then supplied to the CPU 81 via the input-output port 85 and the bus 86.

The CPU 81 of the control unit 80 executes the control program stored in the ROM 83 and described hereinafter, as follows: It operates on the TDC signal from the engine rpm sensor 91 and the on-off signal from the accelerator pedal switch 92, to determine whether or not the engine is operating in an idling condition. When the engine is determined to be in an idling condition, the CPU 81 compares the value of the field current value signal with first and second predetermined values previously stored in the ROM 83 to be applied during idling operation of the engine, and then supplies a control signal corresponding to the resultant determination to the solenoids 22e, 23e of the actuator 20 in FIG. 2 through the bus 86, the input-output port 85 and the driving circuit 88 in FIG. 3, so as to energize one of the solenoids 22e and 23e or deenergize both of same to maintain the value of the field current within the range between the first and second predetermined values, in a manner described hereinafter.

Figure 4:
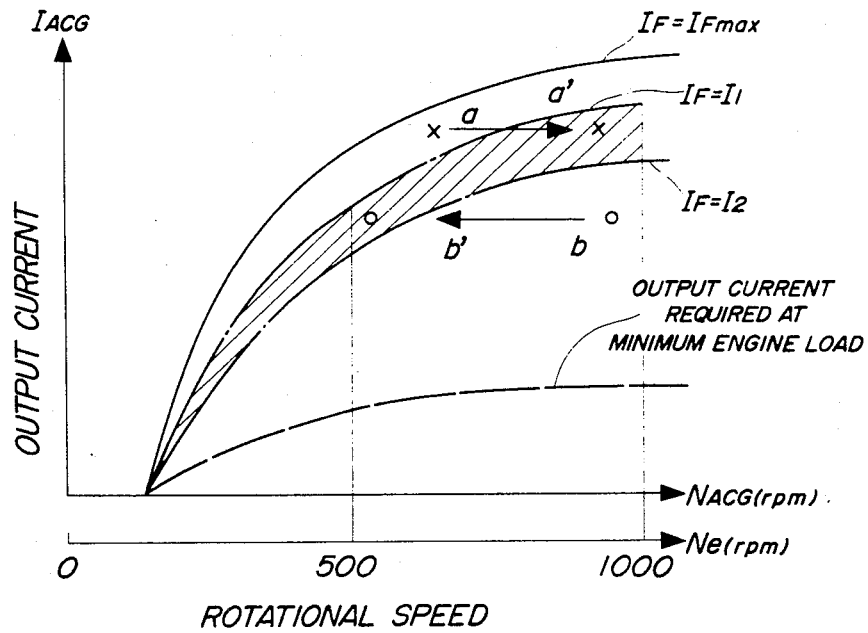
FIG. 4 is a graph showing the relationship between the output current of an alternating-current generator and the rotational speed of same.

FIG. 4 shows the relationship between the output current IACG of the AC generator 30 and the rotational speed NACG of same. As shown in FIG. 4, the output current IACG increases as the rotational speed NACG which is proportional to the rotational speed Ne of the engine increases, and also the same current IACG increases as the value of the field current IF flowing in the field winding 32 of the generator 30 increases. When the rated load field current IFmax flows in the field winding 32, the rated output current dependent on the rotational speed NACG is generated by the AC generator 30, as indicated by the solid line in FIG. 4.

In FIG. 4, the upper one-dot chain line shows the relationship between the rotational speed NACG of the generator 30 and the first predetermined values I1, and the lower one-dot chain line that between the rotational speed NACG and the second predetermined value I2, respectively, according to the invention. The broken line in FIG. 4 shows a rotational speed-output current characteristic of the generator 30, which is achieved when the engine 10 is loaded with a minimum load, that is, when the engine is free from all the electrical loads 60 in FIG. 2 and loaded with a minimum load just required for continued operation of the engine, such as one applied by the fuel pump, while the engine is in an idling condition.

According to the embodiment of the invention, the field current IF has its value maintained between the first and second predetermined values I1, I2 (the region which is hatched in FIG. 4), during idling operation of the engine 10. The field current value IF can be regarded as a barometer directly indicating the magnitude of the load applied on the generator 30, which load in turn is added to the engine load as retarding torque, and can be utilized as a control parameter for controlling the actuator 20 which controls the output torque of the engine. Also, advantageously the field current value IF can be accurately detected with ease, as it varies in a continuous manner between zero and the rated load field current value IFmax in response to changes in the load applied on the generator 30. According to the invention, therefore, while the engine is in an idling condition, the rotational speed of the engine is controlled in response to the magnitude of the electrical load applied on the generator 30, so as to obtain a required amount of output power from the AC generator 30. Thus, the invention can satisfy two contradictory requirements at the same time, i.e. supply of sufficient electric power from the generator 30 and reduction of the rotational speed of the engine to a desired value for the fuel economy of the engine.

Figure 5:
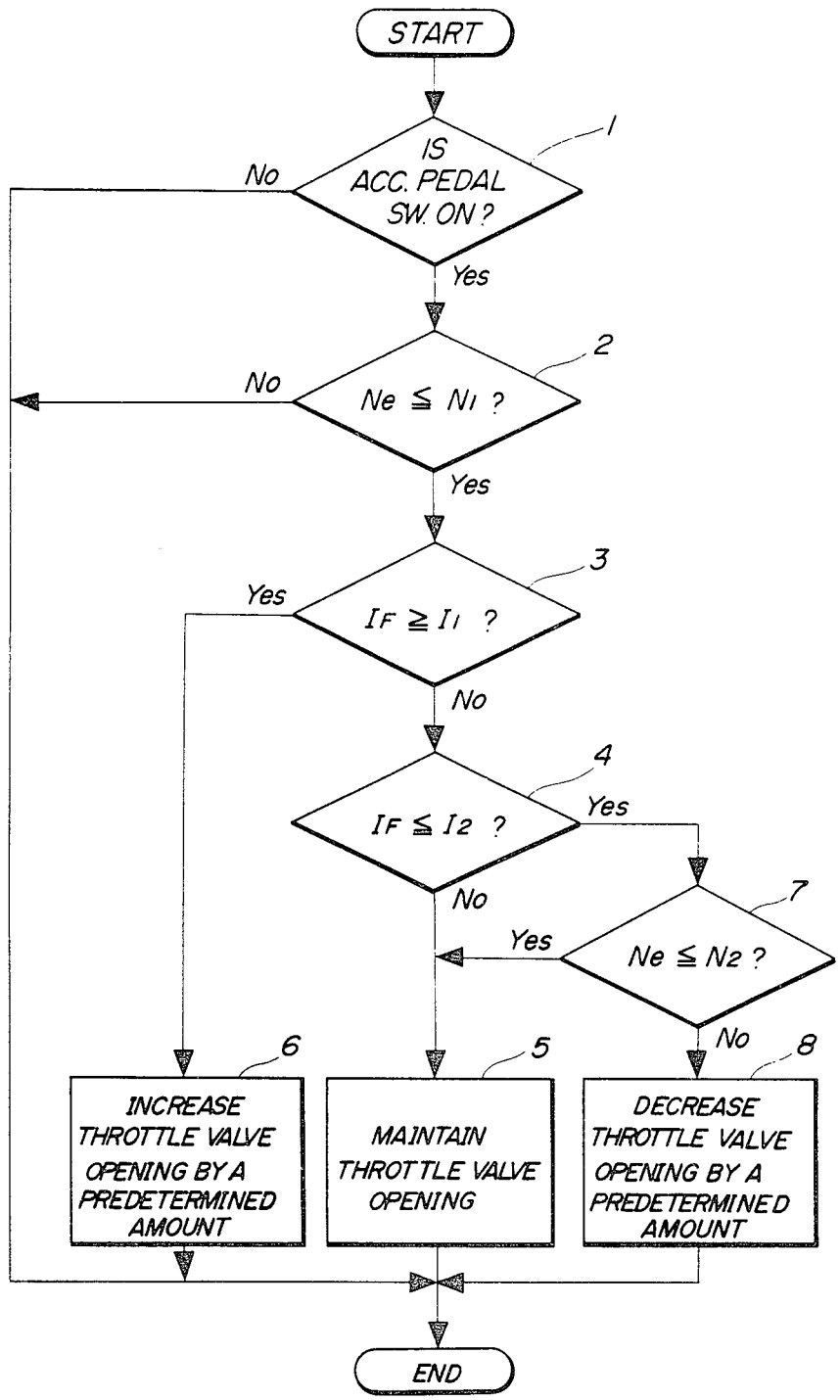
FIG. 5 is a flow chart showing an example of a control program for controlling the idling rpm of the engine according to the method of the invention, which is executed by the control unit shown in FIGS. 2 and 3.

FIG. 5 shows a flow chart of the control program executed by the CPU 81 in FIG. 3 for control of the idling rpm of the engine. The present program may be executed either in synchronism with rotation of the engine, or at predetermined intervals of time. First, at the step 1, it is determined as to whether or not the accelerator pedal switch 92 in FIG. 2 is on. If the answer is no, it is determined that the engine is not operating in an idling condition, and execution of the present program is therefore terminated. If the answer to the question of the step 1 is yes, it is determined at the step 2 whether or not the rotational speed Ne of the engine is smaller than a predetermined value N1, e.g. 1000 rpm. If the determination at the step 2 provides a negative answer, it is judged that the engine is not in an idling condition and therefore the program is terminated, whereas if an affirmative answer is obtained at the step 2, the engine is judged to be operating in an idling condition, and the program proceeds to the step 3. The purpose of the present invention lies in that the idling rpm of the engine is varied within a predetermined range. Therefore, the predetermined value N1 is set at a value slightly higher than a conventionally set value of the idling rpm, that is, at such a value that if the value of the field current is maintained between the first and second predetermined values, referred to later, required output power can be supplied from the generator 30 even if a maximum electrical load is applied on the generator 30. For example, it is set at 1000 rpm as stated above.

At the step 3, it is determined as to whether or not the value of the field current IF of the generator 30 is larger than or equal to the first predetermined value I1. The first predetermined value I1 is set, for instance, at a value 0.95 times as large as or slightly smaller than the rated load value IFmax of the field current of the generator 30, as shown in FIG. 4. The reason for setting the first predetermined value I1 at a value slightly smaller than the value IFmax is that a margin between the values IFmax and I1 can reduce the possibility of the field current value IF exceeding the value IFmax, thereby achieving stable control of the field current IF. If the answer to the question of the step 3 is no, the program proceeds to the step 4 to determine whether or not the value of the field current IF is smaller or equal to than the second predetermined value I2. The second predetermined value I2 is set, for instance, at a value 0.85 times as large as or smaller than the rated load value IFmax of the field current, as shown in FIG. 4 by such an amount that an insensitive zone is provided between the first and second predetermined values I1, I2 for the stability of control of the field current IF, thereby avoiding hunting of the engine rotation. If the answer to the question of the step 4 is no, the program proceeds to the step 5 wherein the solenoids 22e, 23e of the actuator 20 are both deenergized by the control unit 80 to keep the normally closed solenoid valves 22, 23 closed so that the pressure in the control chamber 21b of the control valve 21, appearing in FIG. 2, is maintained so as to keep the diaphragm 21c in a position then assumed, thereby maintaining the valve opening of the throttle valve 14.

If the answer to the question of the step 3 is yes, that is, when it is determined that the detected value of the field current is larger than or equal to the first predetermined value I1, the program proceeds to the step 6 to increase the valve opening of the throttle valve 14 by a predetermined amount. On this occasion, the CPU 81 of the control unit 80 supplies a signal to the solenoid 22e through the bus 86, the input-output port 85 and the driving circuit 88 to energize the solenoid 22e, for a predetermined constant period of time T which is set irrespective of the difference (>0) between the detected value of the field current from the detecting circuit 70 and the first predetermined value I1, or for a predetermined period of time T' which is set to a value corresponding to the same difference. As a consequence, the first and second ports 22a, 22b of the solenoid valve 22 are communicated with each other for the predetermined period of time T or T', to introduce negative pressure within the intake pipe 11 into the control chamber 21b of the control valve 21 to reduce the internal pressure of the same chamber 21b. Responsive to this change in the internal pressure of the control chamber 21b, the diaphragm 21c is displaced in a direction compressing the spring 21d, so as to cause displacement of the connecting member 25 and the second lever 14b to increase the opening of the throttle valve 14, thereby increasing the output torque of the engine 10. Then, the diaphragm 21c assumes a new equilibrated position after the valve opening of the throttle valve 14 has increased by an amount corresponding to the above period of time T or T'. Preferably, the period of time T or T' is set to a value less than the period with which the control program is repeatedly executed. As a consequence of the operation described above, the operative state of the generator is shifted, for instance, from one point a toward another point a', as indicated by the arrow x—x in FIG. 4.

Reverting to FIG. 5, if the answer to the question of the step 4 is yes, that is, when it is determined that the value of the field current IF is smaller than or equal to the second predetermined value I2, the program proceeds to the step 7 to determine whether or not the rotational speed Ne of the engine is smaller or equal to than a predetermined lower limit value N2, e.g. 500 rpm. If the answer to the question of the step 7 is no, the valve opening of the throttle valve 14 is decreased by a predetermined amount, at the step 8, and thereafter the valve opening of the throttle valve 14 thus decreased is maintained. On this occasion, the CPU 81 of the control unit 80 supplies a signal to the solenoid 23e through the bus 86, the input-output port 85 and the driving circuit 88 to energize the solenoid 23e, for the aforementioned predetermined period of time T or T'. Accordingly, the first and second ports 23a, 23b of the solenoid valve 23 are communicated with each other for the predetermined period of time T or T', to introduce the atmospheric pressure into the control chamber 21b to increase the internal pressure of the same chamber 21b. Then, the valve opening of the throttle valve 14 is decreased to decrease the output torque of the engine 10, in the reverse manner to that described before. On such occasion, the operative state of the generator 30 is shifted, for example, from one point b toward another point b', as indicated by the arrow o—o in FIG. 4.

On the other hand, if the answer to the question of the step 7 is yes, the program proceeds to the step 5 wherein the opening of the throttle valve 14 is maintained as it is, so as not to cause a decrease in the rotational speed Ne of the engine, i.e. the rotational speed NACG of the generator 30, resulting from a reduction in the opening of the throttle valve 14. This is because a further decrease in the rotational speed of the engine could impede continuing smooth idling operation of the engine, to even cause engine stall. Alternatively, the control program may be so arranged that it proceeds to the step 6 when the answer to the question of the step 7 is yes, to thereby increase the rotational speed Ne of the engine and maintain same constantly above the predetermined lower limit value N2.

Although in the above embodiment the value of the field current is controlled so as to fall within the predetermined range defined by the first and second predetermined values I1, I2 while the engine is operating in an idling condition, the value of the field current may alternatively be controlled to a single predetermined value, for instance, the first predetermined value I1. In such case, an alternative determination may be made as to whether or not the value of the field current IF is smaller than the first predetermined value I1, at the step 4 in FIG. 5, in place of the aforesaid determination as to whether or not the value IF is smaller than the second predetermined value I2.

Further, although the actuator employed in the above embodiment is adapted to control the quantity of an air/fuel mixture being supplied to the engine, other means such as an intake air control system and an air/fuel ratio control system may alternatively be used as the actuator, so far as it can control the output torque of the engine.

Figure 6:
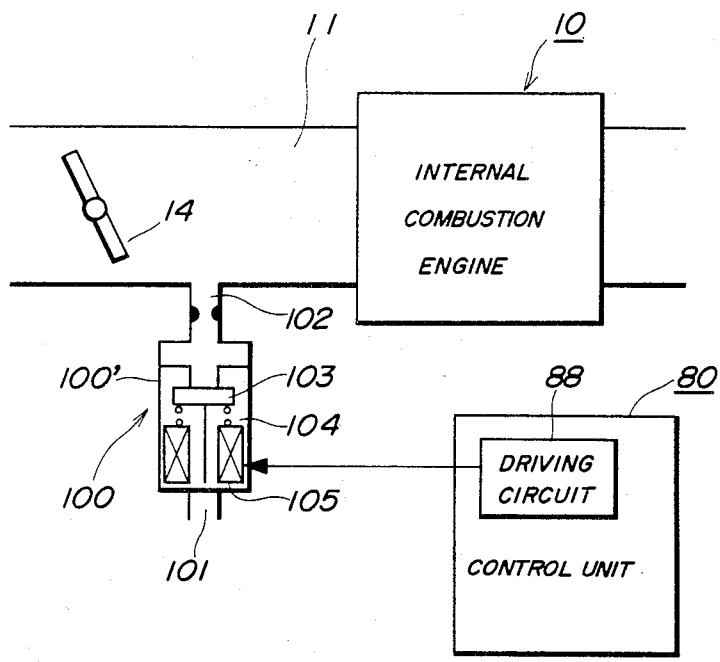
FIG. 6 is a view schematically illustrating an intake air control system which serves as an alternative for the actuator shown in FIG. 2.

FIG. 6 shows a supplementary air control system 100 as another example of the actuator. A control valve 100', which is a normally closed type, forms an essential element of the supplementary air control system 100, and is disposed to be driven by the driving circuit 88 of the control unit 80 to open for introducing the atmosphere into the intake pipe 11. The control valve 100' comprises a communication pipe 101 communicating with the atmosphere, a vacuum-intake pipe 102 communicating with the intake pipe 11 at a location downstream of the throttle valve 14, a valve body 103 arranged between the pipes 101 and 102, a spring 104 urging the valve body 103 toward its closed position, and a solenoid 105 disposed to be energized by a driving pulse signal from the control unit 80 for displacing the valve body 103 toward its opened position. During idling operation of the engine, the output torque of the engine increases with an increase in the quantity of supplementary air being supplied to the engine 10. Therefore, by controlling the supplementary air quantity in a manner such that the driving pulse signal supplied to the control valve 100' from the driving circuit 88 of the control unit 80 has its pulse duration varied in response to the value of the field current of the generator 30 in FIG. 2, the field current IF can be controlled within a predetermined range or to a predetermined value, while the engine is in an idling condition.

Figure 7:
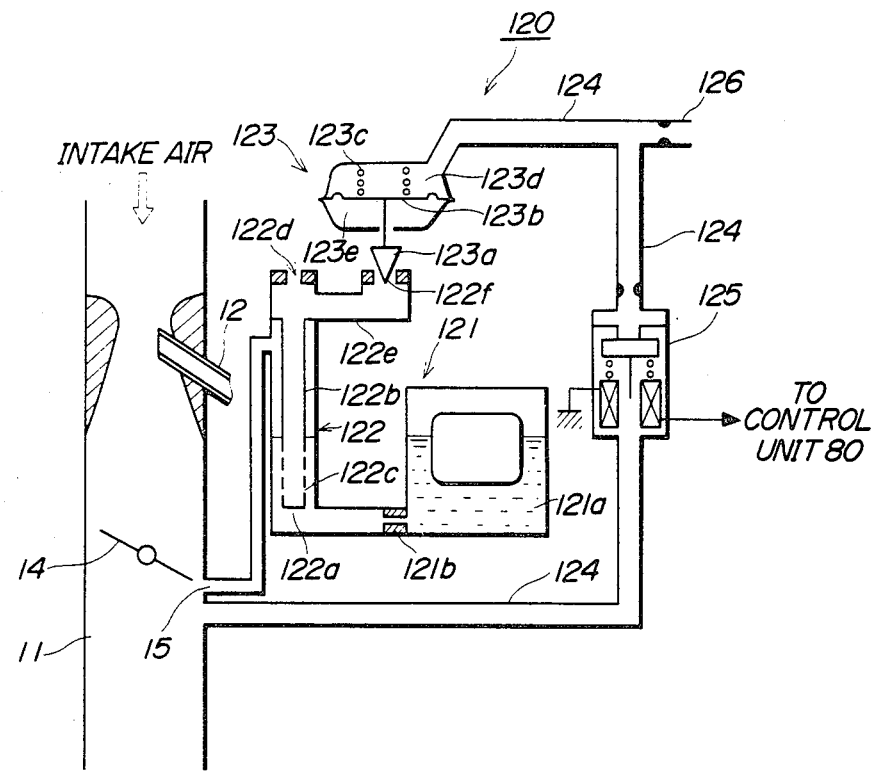
FIG. 7 is a view schematically illustrating an air/fuel ratio control system which serves as an alternative for the actuator in FIG. 2.

FIG. 7 shows an air/fuel ratio control system 120 as still another example of the actuator, which is attached to the carburetor 121 of the engine. A float chamber 121a of the carburetor 121 is communicated with an idle port 15 opening in the intake pipe 11 at a location downstream of the throttle valve 14, through a main jet 121b and a fuel reservoir 122a of an air bleed means 122. An air bleed pipe 122b, which has its lower portion formed with bleed holes 122c, is inserted in the fuel reservoir 122a and communicated with the atmosphere through a main air jet 122d. An auxiliary air bleed pipe 122e extends from an upper end of the air bleed pipe 122b and has its one end formed with an auxiliary air jet 122f which is disposed to have its cross-sectional area controlled by a valve body 123a of an air/fuel ratio control valve 123. The control valve 123 has a diaphragm 123b which defines a negative pressure chamber 123d and an atmospheric pressure chamber 123e at its opposite sides and is connected to the valve body 123a and permanently urged by a spring 123c in a direction closing the auxiliary air jet 122f. A solenoid valve 125, which is a normally closed type, is arranged across a vacuum-intake pipe 124 communicating the vacuum chamber 123d with the intake pipe 11. Reference numeral 126 designates a communication pipe communicating with the atmosphere.

Figure 8:
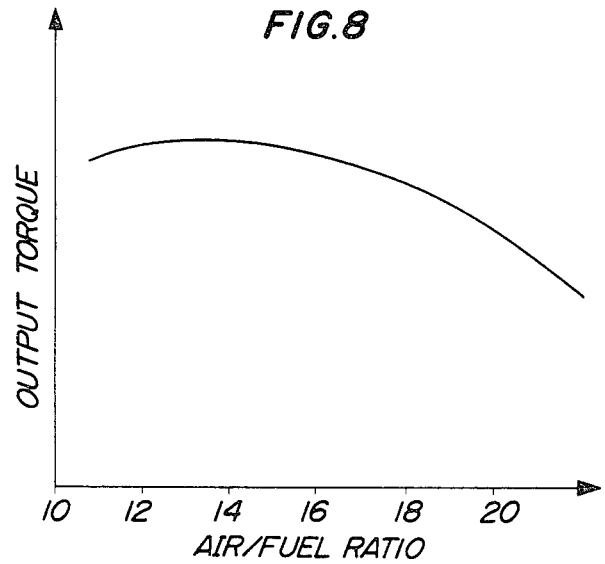
FIG. 8 is a graph showing an air/fuel ratio-output torque characteristic of the engine.

According to the above air/fuel ratio control system 120, vacuum or negative pressure prevailing in the intake pipe 11 acts upon the interior of the fuel reservoir 122a through the idle port 15 to cause bleed air to be introduced through the jets 122d, 122f into the fuel reservoir 122a and mixed with fuel therein. The amount of bleed air to be mixed with fuel is controlled by increasing or decreasing the cross-sectional area of the jet 122f by means of the control valve 123, and an increase in the same amount causes the air/fuel ratio to become leaner. On the other hand, the engine 10 has an air/fuel ratio-output torque characteristic as shown in FIG. 8, for instance. Therefore, the output torque of the engine 10 can be controlled by controlling the value of the air/fuel ratio of an air/fuel mixture being supplied to the engine 10 in response to the detected value of the field current of the generator 30 in FIG. 2, by means of the air/fuel ratio control system 120 under control of the control unit 80, while the engine is in an idling condition, thus making it possible to control the field current or the idling rpm of the engine in the same manner as the above-described embodiments. In place of the above system 120, a fuel injection system may alternatively be employed to control the air/fuel ratio, which is adapted, for example, to be driven by the control unit 80 and supply a required amount of fuel to the intake pipe 11 of the engine 10 in response to the detected value of the field current for control of the air/fuel ratio, i.e. the rotational speed of the engine during idling operation of same.

What is claimed is:

1. A method of controlling the rotational speed of an internal combustion engine during idling operation thereof, said engine having an output shaft, an actuator operable to vary output torque produced by said engine through said output shaft, an alternating-current generator driven by said engine through said output shaft for rotation therewith, said alternating-current generator being adapted to generate electric power in an amount corresponding to a value of field current flowing therein and the rotational speed of said engine, and regulator means adapted to vary the value of said field current of said alternating-current generator in response to electrical load applied on said alternating-current generator, the method comprising the steps of: (a) detecting a value of a parameter indicative of said field current of and applied electrical load on said alternating-current generator; (b) determining whether or not said engine is operating in an idling condition; and (c) controlling the operation of said actuator in response to the detected value of said parameter to vary said output torque of said engine, to thereby control the rotational speed of said engine such that the value of said field current of said alternating-current generator becomes equal to a predetermined value approximately equal to the value required for the applied electrical load on said alternating-current generator, when it is determined that said engine is operating in said idling condition.

2. A method as claimed in claim 1, wherein said step (c) comprises comparing the detected value of said parameter with a predetermined value corresponding to said predetermined value of said field current, controlling said actuator in a manner such that said output torque of said output shaft is increased to increase the rotational speed of said engine when it is determined that the detected value of said parameter is larger than said predetermined value thereof, and controlling said actuator in a manner such that said output torque is decreased to decrease the rotational speed of said engine when it is determined that the detected value of said parameter is smaller than said predetermined value thereof.

3. A method as claimed in claim 1, wherein said predetermined value of said field current is set at a value close to but smaller than a rated load value of said field current of said alternating-current generator.

4. A method as claimed in claim 1, further comprising determining whether or not the rotational speed of said engine is larger than a predetermined lower limit value when it is determined that said engine is operating in said idling condition, wherein said actuator is controlled to bring the value of said field current to said predetermined value thereof by said step (c) only when it is determined that the rotational speed of said engine is larger than said predetermined lower limit value.

5. A method as claimed in claim 1, wherein said actuator controls the air/fuel ratio of an air/fuel mixture being supplied to said engine.

6. A method as claimed in claim 1, wherein said actuator controls the quantity of an air/fuel mixture being supplied to said engine.

7. A method as claimed in claim 1, wherein said actuator controls the quantity of air being supplementally supplied to said engine.

8. A method of controlling the rotational speed of an internal combustion engine during idling operation thereof, said engine having an output shaft, an actuator operable to vary output torque produced by said engine through said output shaft, an alternating-current generator driven by said engine through said output shaft for rotation therewith, said alternating-current generator being adapted to generator electric power in an amount corresponding to a value of field current flowing therein and the rotational speed of said engine, and regulator means adapted to vary the value of said field current of said alternating-current generator in response to electrical load applied on said alternating-current generator, the method comprising the steps of: (a) detecting a value of a parameter indicative of said field current of and applied electrical load on said alternating-current generator; (b) determining whether or not said engine is operating in an idling condition; (c) determining whether or not the detected value of said parameter is larger than a first predetermined value; (d) determining whether or not the detected value of said parameter is smaller than a second predetermined value which is smaller than said first predetermined value; (e) controlling the operation of said actuator in a manner such that said output torque of said engine is increased to increase the rotational speed of said engine when it is determined at said step (b) that said engine is operating in said idling condition and at the same time it is determined at said step (c) that the detected value of said parameter is larger than said first predetermined value; and (f) controlling said actuator in a manner such that said output torque is decreased to decrease the rotational speed of said engine when it is determined at said step (b) that said engine is operating in said idling condition and at the same time it is determined at said step (d) that the detected value of said parameter is smaller than said second predetermined value, to thereby control the rotational speed of said engine such that the value of said field current of said alternating-current generator is maintained within a predetermined range which includes the value required for the applied electrical load on said alternating-current generator, when it is determined that said engine is operating in said idling condition.

9. A method as claimed in claim 8, wherein said first and second predetermined values of said parameter are set at values close to but smaller than a value corresponding to a rated load value of said field current of said alternating-current generator.

10. A method as claimed in claim 8, further comprising determining whether or not the rotational speed of said engine is larger than a predetermined lower limit value when it is determined that said engine is operating in said idling condition, wherein said actuator is controlled to maintain the value of said field current within said predetermined range by said steps (e) and (f) only when it is determined that the rotational speed of said engine is larger than said predetermined lower limit value.

11. A method as claimed in claim 8, wherein said actuator controls the air/fuel ratio of an air/fuel mixture being supplied to said engine.

12. A method as claimed in claim 8, wherein said actuator controls the quantity of an air/fuel mixture being supplied to said engine.

13. A method as claimed in claim 8, wherein said actuator controls the quantity of air being supplementally supplied to said engine.

* * * * *